(12) United States Patent
Droz et al.

(10) Patent No.: US 10,954,169 B2
(45) Date of Patent: Mar. 23, 2021

(54) PROCESS FOR MANUFACTURING A CERAMIC COMPOSITE MATERIAL PART BY PRESSURIZED INJECTION OF A LOADED SLURRY INTO A POROUS MOULD

(71) Applicants: SAFRAN AIRCRAFT ENGINES, Paris (FR); SAFRAN, Paris (FR)

(72) Inventors: Nicolas Droz, Sainte Genevieve des Bois (FR); Ludovic Philippe Liais, Saint-Maur-des-Fosses (FR); Adrien Paixao, Dammarie les Lys (FR); Michael Podgorski, Paris (FR); Sofia Haifi, Paris (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 0 days.

(21) Appl. No.: 15/766,206

(22) PCT Filed: Oct. 4, 2016

(86) PCT No.: PCT/FR2016/052535
§ 371 (c)(1),
(2) Date: Apr. 5, 2018

(87) PCT Pub. No.: WO2017/060601
PCT Pub. Date: Apr. 13, 2017

(65) Prior Publication Data
US 2018/0297901 A1   Oct. 18, 2018

(30) Foreign Application Priority Data

Oct. 5, 2015   (FR) ...................................... 1559430

(51) Int. Cl.
*C04B 35/565* (2006.01)
*C04B 35/584* (2006.01)
(Continued)

(52) U.S. Cl.
CPC ............ *C04B 41/4584* (2013.01); *B28B 1/24* (2013.01); *B28B 1/262* (2013.01); *B28B 1/266* (2013.01);
(Continued)

(58) Field of Classification Search
CPC .............. C04B 41/4584; C04B 35/185; C04B 2235/5252; B28B 1/24; B28B 7/344; B28B 23/0006; D03D 15/00
(Continued)

(56) References Cited

U.S. PATENT DOCUMENTS 5,436,042 A * 7/1995 Lau .................... C04B 35/80
264/28
5,489,408 A * 2/1996 Nakano .................... B28B 3/02
264/624
(Continued)

FOREIGN PATENT DOCUMENTS

EP   2 357 070 A1   8/2011
FR   2 359 803 A1   2/1978
(Continued)

OTHER PUBLICATIONS

Machine Translation of Nakano, Kikuo, and Kamiya Akira. "FR2702475A1—Process for the Manufacture of Ceramics Reinforced with Fibres Arranged in Three Dimensions, and Apparatus for Implementing This Process." Google Patents, Google, 1993, patents.google.com/patent/FR2702475A1/en?oq=FR2702475. (Year: 1993).*
(Continued)

*Primary Examiner* — Alison L Hindenlang
*Assistant Examiner* — Andrés E. Behrens, Jr.
(74) *Attorney, Agent, or Firm* — Pillsbury Winthrop Shaw Pittman LLP

(57) ABSTRACT

A method of fabricating a composite material part includes injecting under pressure a slurry containing a powder of
(Continued)

refractory ceramic particles into a fiber texture; and draining the liquid of the slurry that has passed through the fiber texture, while retaining the powder of refractory ceramic particles within the texture to obtain a fiber preform filled with refractory ceramic particles. The injection tooling includes a porous material mold including an internal housing in which the fiber texture is placed, the slurry being injected into the fiber texture via an injection port in the injection tooling and leading into the internal housing of the mold. The tooling includes a rigid material enclosure in which the porous material mold is held while the slurry is injected under pressure and while the liquid of the slurry is drained, the liquid of the slurry being discharged via a vent present in the enclosure.

16 Claims, 2 Drawing Sheets

(51) Int. Cl.
| | |
|---|---|
| *C04B 35/14* | (2006.01) |
| *C04B 35/185* | (2006.01) |
| *C04B 35/117* | (2006.01) |
| *C04B 35/488* | (2006.01) |
| *C04B 35/18* | (2006.01) |
| *C04B 41/45* | (2006.01) |
| *C04B 41/50* | (2006.01) |
| *D03D 15/00* | (2021.01) |
| *F01D 5/28* | (2006.01) |
| *C04B 35/80* | (2006.01) |
| *B28B 23/00* | (2006.01) |
| *C04B 35/58* | (2006.01) |
| *C04B 35/626* | (2006.01) |
| *B28B 7/34* | (2006.01) |
| *B28B 1/24* | (2006.01) |
| *B28B 1/26* | (2006.01) |
| *C04B 35/447* | (2006.01) |
| *D03D 1/00* | (2006.01) |
| *D03D 11/00* | (2006.01) |
| *D03D 25/00* | (2006.01) |
| *C04B 35/64* | (2006.01) |

(52) U.S. Cl.
CPC .......... *B28B 7/344* (2013.01); *B28B 23/0006* (2013.01); *C04B 35/117* (2013.01); *C04B 35/14* (2013.01); *C04B 35/18* (2013.01); *C04B 35/185* (2013.01); *C04B 35/447* (2013.01); *C04B 35/488* (2013.01); *C04B 35/565* (2013.01); *C04B 35/584* (2013.01); *C04B 35/58071* (2013.01); *C04B 35/6263* (2013.01); *C04B 35/6264* (2013.01); *C04B 35/62655* (2013.01); *C04B 35/64* (2013.01); *C04B 35/80* (2013.01); *C04B 35/803* (2013.01); *C04B 35/806* (2013.01); *D03D 1/00* (2013.01); *D03D 11/00* (2013.01); *D03D 15/00* (2013.01); *D03D 25/005* (2013.01); *F01D 5/282* (2013.01); *F01D 5/284* (2013.01); *C04B 2235/3217* (2013.01); *C04B 2235/5224* (2013.01); *C04B 2235/5228* (2013.01); *C04B 2235/5232* (2013.01); *C04B 2235/5244* (2013.01); *C04B 2235/5248* (2013.01); *C04B 2235/5252* (2013.01); *C04B 2235/5256* (2013.01); *C04B 2235/5436* (2013.01); *C04B 2235/5445* (2013.01); *C04B 2235/6022* (2013.01); *C04B 2235/6027* (2013.01); *C04B 2235/616* (2013.01); *D10B 2101/08* (2013.01); *D10B 2505/02* (2013.01); *F05D 2230/22* (2013.01); *F05D 2240/24* (2013.01); *F05D 2300/2261* (2013.01); *F05D 2300/2283* (2013.01); *F05D 2300/6033* (2013.01); *F05D 2300/6034* (2013.01)

(58) Field of Classification Search
USPC ........................................................ 264/640
See application file for complete search history.

(56) References Cited

U.S. PATENT DOCUMENTS

| | | | |
|---|---|---|---|
| 6,251,317 B1* | 6/2001 | Lundberg | C04B 35/117 |
| | | | 264/44 |
| 10,183,450 B2* | 1/2019 | Henrio | B30B 1/003 |
| 2003/0034113 A1 | 2/2003 | Butler et al. | |
| 2012/0217670 A1* | 8/2012 | Ruiz | B29C 70/443 |
| | | | 264/71 |

FOREIGN PATENT DOCUMENTS

| | | | |
|---|---|---|---|
| FR | 2 702 475 A1 | 9/1994 | |
| FR | 2702475 A1 * | 9/1994 | ............... B28B 3/02 |
| JP | 2002-362975 A | 12/2002 | |
| WO | WO 2010/049961 A1 | 5/2010 | |
| WO | WO-2010057502 A2 * | 5/2010 | ......... B29C 65/5057 |
| WO | WO 2016/102839 A1 | 6/2016 | |

OTHER PUBLICATIONS

Vekinis, G., et al. "Plaster of Paris as a Model Material for Brittle Porous Solids." Journal of Materials Science, vol. 28, No. 12, Published 1993, pp. 3221-3227., doi:10.1007/bf00354239. Accessed Jan. 27, 2019 (Year: 1993).*
International Search Report as issued in International Patent Application No. PCT/FR2016/052535, dated Jan. 2, 2017.
Notice of Reasons for Refusal as issued in Japanese Patent Application No. 2018-517597, dated Oct. 27, 2020.

* cited by examiner

PROCESS FOR MANUFACTURING A CERAMIC COMPOSITE MATERIAL PART BY PRESSURIZED INJECTION OF A LOADED SLURRY INTO A POROUS MOULD

CROSS-REFERENCE TO RELATED APPLICATIONS

This application is the U.S. National Stage of PCT/FR2016/052535, filed Oct. 4, 2016, which in turn claims priority to French patent application number 1559430, filed Oct. 5, 2015. The content of these applications are incorporated herein by reference in their entireties.

BACKGROUND OF THE INVENTION

The present invention relates to a method of fabricating a part made of composite material, in particular of the oxide/oxide or ceramic matrix composite (CMC) type, i.e. comprising fiber reinforcement made of refractory ceramic material fibers and densified by a matrix that is likewise made of refractory ceramic material.

Parts made out of oxide/oxide composite material are generally prepared by draping a plurality of fiber plies in a mold, which plies are made of refractory oxide fibers, and each of the plies is previously impregnated with a slurry filled with refractory oxide particles. The set of plies as arranged in that way is then compacted by using a countermold or a vacuum cover, and by passing through an autoclave. The resulting filled preform is then subjected to sintering in order to form a refractory oxide matrix within the preform and obtain a part made of oxide/oxide composite material. That technique can also be used for making parts out of ceramic matrix composite (CMC) material. Under such circumstances, the fiber plies are made of carbon or silicon carbide (SiC) fibers and they are impregnated with a slurry filled with particles of carbide (e.g. SiC), of boride (e.g. $TiB_2$), or of nitride (e.g. $Si_3N_4$).

Nevertheless, a preparation method of that type is capable of making oxide/oxide or CMC composite material parts that present only small thickness, and fiber reinforcement that is two-dimensional (2D) only. The mechanical characteristics of those types of composite material remain limited in certain directions. In particular, those materials withstand delamination poorly, and they do not withstand shear forces well.

Making fiber textures obtained by three-dimensional weaving between continuous warp and weft yarns enables the mechanical strength of the material to be increased, and in particular enables its ability to withstand delamination to be increased. Under such circumstances, and also for thick 2D fiber textures, only methods that make use of a pressure gradient, such as methods of the infusion type, of the resin transfer molding (RTM) type, or of the submicrometer powder suction type, enable a filled slurry to penetrate into the fiber texture of thickness that may be as much as several tens of millimeters, depending on the intended application.

Nevertheless, the pressure gradient between the portion of the fiber texture via which the filled slurry is injected and the other portion of the fiber texture via which the liquid phase of the slurry is to be discharged is difficult to control over the entire fiber texture. If the pressure is not balanced over the entire surface area of the fiber texture facing the end of the mold having one or more discharge vents through which the liquid phase of the slurry is to be discharged, then pressure differences are created between zones that are close to the vents and zones that are further away. Under such circumstances, it is difficult to discharge the liquid phase since it needs to be removed from the texture without disturbing the distribution of solid particles (refractory oxide, carbide, boride, nitride, etc.) deposited by means of the slurry. Specifically, on being discharged, the liquid phase may take particles with it and/or may modify the distribution of particles within the fiber texture, thereby leading to large pores appearing in the final material because of the lack of matrix in certain locations.

OBJECT AND SUMMARY OF THE INVENTION

An object of the present invention is to remedy the above-mentioned drawbacks and to propose a solution to make it possible to make parts out of composite material, in particular of the oxide/oxide or CMC type, from a fiber texture that is thick and/or of complex shape, and to do so in a manner that is fast and reliable, while providing good control over the deposition and distribution of solid particles within the fiber texture in order to obtain a material having a very low fraction of macropores.

To this end, the invention proposes a method of fabricating a composite material part, the method comprising the following steps:
  forming a fiber texture from refractory ceramic fibers;
  placing the fiber texture in injection tooling;
  injecting under pressure a slurry containing a powder of refractory ceramic particles into the fiber texture;
  draining the liquid of the slurry that has passed through the fiber texture, while retaining the powder of refractory ceramic particles within said texture so as to obtain a fiber preform that is filled with ceramic particles;
  drying the fiber preform;
  unmolding the fiber preform; and
  sintering the refractory ceramic particles present in the fiber preform in order to form a refractory matrix in said preform;
  the method being characterized in that the injection tooling comprises a mold of porous material including an internal housing in which the fiber texture is placed, the slurry being injected into the fiber texture via at least one injection port present in the injection tooling and leading into the internal housing of the porous material mold, the tooling further comprising an enclosure made of rigid material in which the porous material mold is held while injecting the slurry under pressure and while drawing the liquid of said slurry, the liquid of the slurry being discharged via at least one vent present in the rigid material enclosure.

By using a mold made of porous material, the method of the invention makes it possible to eliminate the liquid phase of the slurry that has been introduced into the fiber texture without eliminating the refractory solid particles that are also present in the texture. Also, since the porous material mold surrounds the entire fiber texture, the liquid of the slurry can be drained from said texture in all directions, i.e. via any point of the interface between the texture and the mold. This serves to enhance deposition by uniform and dense sedimentation of the refractory ceramic particles in the fiber texture, and consequently to obtain a matrix volume fraction in the final composite material part that is high and to increase drainage time significantly. Consequently, the composite material part presents improved mechanical properties.

Also, since the porous material mold is held in an enclosure made of rigid material, it can withstand the pressure with which the filled slurry is injected into the texture and also the pressure exerted by pumping in order to discharge the liquid medium of the slurry.

According to a particular characteristic of the method of the invention, the porous material mold presents a size smaller than the inside volume of the rigid material enclosure, the volume present between the porous material mold and the rigid material enclosure being filled in with a compact porous medium. The use of a porous medium serves in particular to facilitate integrating the porous material mold in the injection tooling by fitting closely to any type of mold shape, even if complex, while ensuring that forces are well transferred between the mold and the enclosure of the injection tooling. This transfer makes it possible to raise pressure without deforming the porous mold. Sealing problems are thus considerably reduced. Furthermore, the presence of a porous medium around the mold makes it possible to discharge the liquid of the slurry better from the porous material mold, thereby making it easier to clean after each injection, and consequently facilitating reuse thereof.

The empty volume present in the porous medium is preferably greater than the volume of the liquid phase of the slurry injected into the fiber texture.

The porous medium may be constituted in particular by sand, by a foam, or by any granular material having a stacking fraction that makes it possible to provide a housing or a passage for the filtrate.

In a particular aspect of the method of the invention, the mold may be made of a material selected from at least one of the following materials: porous resin and plaster.

During the step of forming the fiber texture, the yarns may be woven using three-dimensional or multilayer weaving. The fiber texture may also be made by stacking plies woven by two-dimensional weaving, the texture resenting a thickness of at least 0.5 millimeters (mm), and preferably of at least 1 mm.

The yarns of the preform may be yarns made of fibers constituted by one or more of the following materials: alumina; mullite; silica; an aluminosilicate; a borosilicate; silicon carbide; and carbon.

The refractory ceramic particles may be made of a material selected from: alumina; mullite; silica; an aluminosilicate; an aluminophosphate; zirconia; a carbide; a boride; and a nitride.

In an embodiment, the resulting part made of composite material may constitute a turbine engine blade.

BRIEF DESCRIPTION OF THE DRAWINGS

Other characteristics and advantages of the invention appear from the following description of particular implementations of the invention, given as non-limiting examples, and with reference to the accompanying drawings, in which.

DETAILED DESCRIPTION OF EMBODIMENTS

Figure 1:
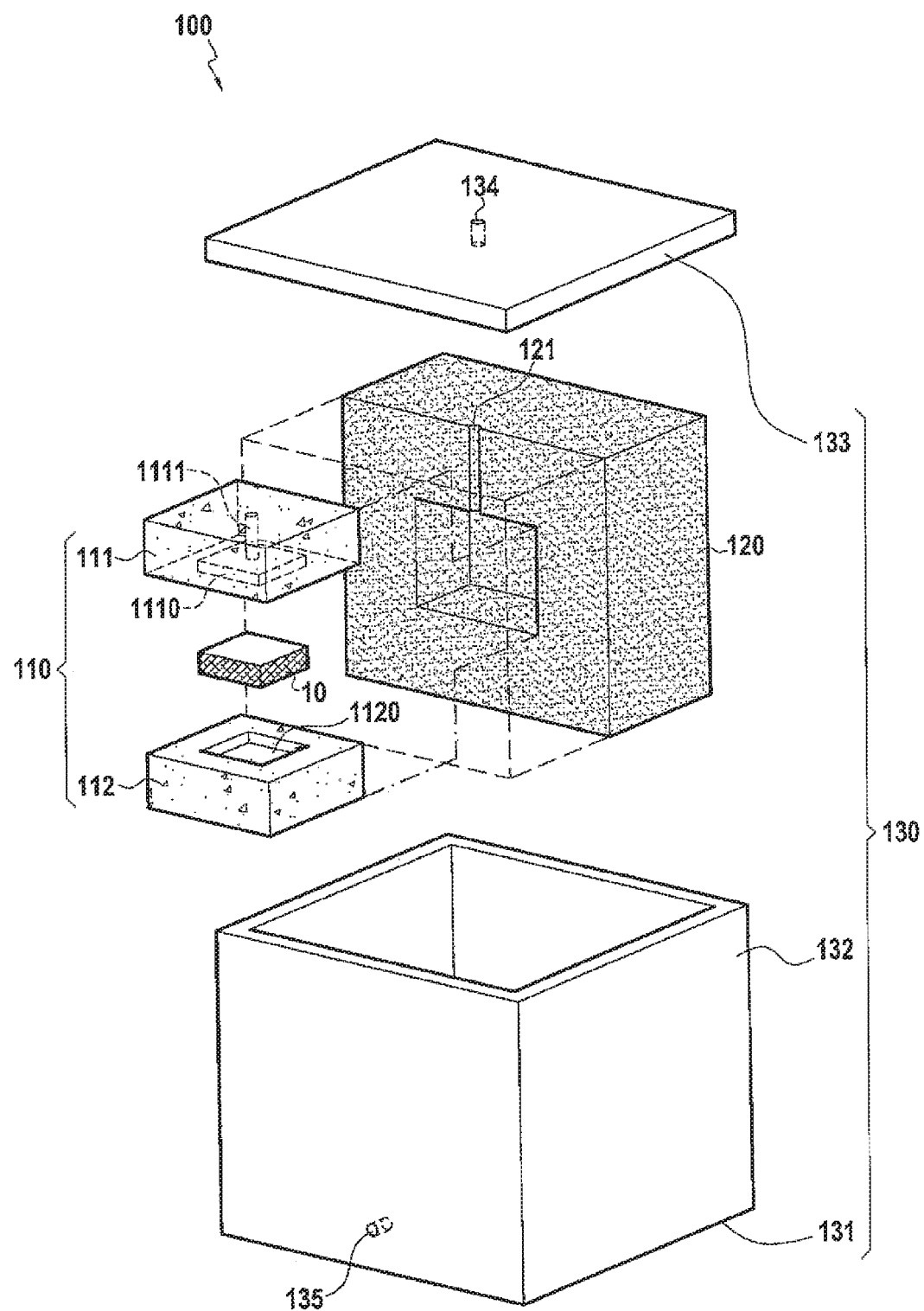
FIG. 1 is a diagrammatic exploded perspective view of injection tooling in an embodiment of the invention.

The method of the invention for fabricating a composite material part, in particular of the oxide/oxide or CMC type, begins by making a fiber texture that is to form the reinforcement of the part.

The fiber structure is made in conventional manner by weaving using a Jacquard type loom having a bundle of warp yarns or strands arranged thereon in a plurality of layers, with warp yarns being interlinked by weft yarns, or vice versa. The fiber texture may be made by stacking plies obtained by two-dimensional (2D) weaving. The fiber texture may also be made directly as a single piece by three-dimensional (3D) weaving. The term "two-dimensional weaving" is used herein to mean conventional weaving in which each weft yarn passes from one side to the other of a single layer of warp yarns, or vice versa. The method of the invention is particularly suitable for enabling a filled slurry to be introduced into 2D fiber textures, i.e. textures of large thickness obtained by stacking 2D plies, i.e. 2D fiber structures having thickness of at least 0.5 mm, and preferably at least 1 mm.

The term "three-dimensional weaving" or "3D weaving", or indeed "multilayer weaving" is used herein to mean a weaving technique in which at least some of the weft yarns interlink warp yarns over a plurality of layers of warp yarns, or vice versa, using a weave that may in particular be selected from the following weaves: interlock; multi-plain; multi-satin; and multi-twill.

The term "interlock weave or fabric" it is used herein to mean a 3D weave in which each layer of warp yarns interlinks a plurality of layers of weft yarns, with all of the yarns in a given warp column having the same movement in the weave plane.

The term "multi-plain weave or fabric" it is used herein to mean 3D weaving with a plurality of layers of weft yarns in which the base weave of each layer is equivalent to a conventional plain type weave, but with certain points of the weave interlinking weft yarn layers with one another.

The term "multi-satin weave or fabric" it is used herein to mean 3D weaving with a plurality of layers of weft yarns in which the base weave of each layer is equivalent to a conventional satin type weave, but with certain points of the weave interlinking weft yarn layers with one another.

The term "multi-twill weave or fabric" it is used herein to mean 3D weaving with a plurality of layers of weft yarns in which the base weave of each layer is equivalent to a conventional twill type weave, but with certain points of the weave interlinking weft yarn layers with one another.

3D textures present a configuration that is complex, and into which it is difficult to introduce solid particles in suspension and to spread them out uniformly. The method of the invention is also very well adapted to introducing a filled slurry into 3D woven fiber textures.

The yarns used for weaving the fiber texture that is to form the fiber reinforcement of the composite material part may in particular be made of fibers constituted by one of the following materials: alumina, mullite, silica, an aluminosilicate, a borosilicate, silicon carbide, carbon, or a mixture of a plurality of these materials.

Figure 2:
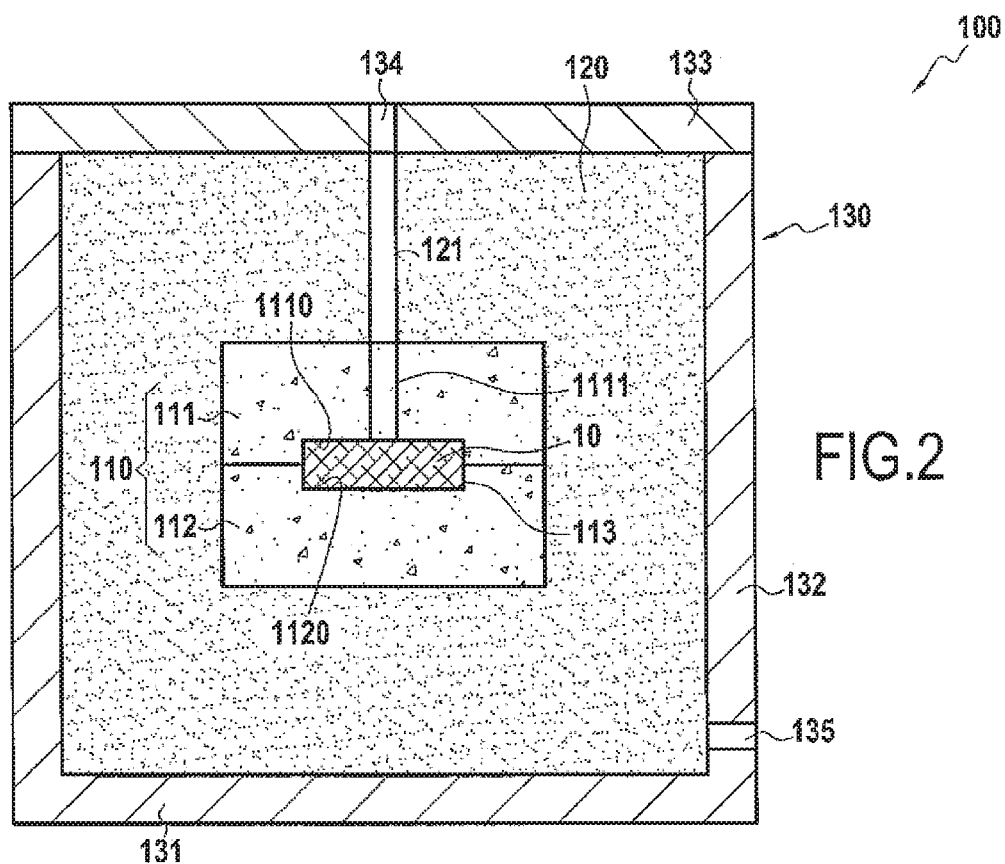
FIG. 2 is a diagrammatic section view showing the FIG. 1 tooling when closed with a fiber texture positioned therein.

Once the fiber texture has been made, it is placed in injection tooling in accordance invention to enable refractory particles to be deposited within the fiber texture, as explained below. To this end, and as shown in FIGS. 1 and 2, a fiber texture 10 is placed in injection tooling 100. In the presently described example, the fiber texture 10 is made using one of the techniques defined above (stacking 2D plies or 3D weaving) with yarns made of Nextel 610™ alumina. In this example, the fiber texture 10 is for forming the fiber reinforcement of a blade made of oxide/oxide composite material.

The tooling 100 comprises a mold 110 made of porous material made up of two portions 111 and 112, each having a respective recess 1110 or 1120. The recesses 1110 and 1120 define a mold cavity 113 (FIG. 2) when the two portions 111 and 112 are assembled one against the other, which cavity is to receive the fiber texture. The recesses 1110 and 1120 are of a shape corresponding to the shape of the part that is to be fabricated from the fiber texture. The two portions 111 and 112 serve to determine the dimensions of the preform and thus of the part that is to be obtained, and also to adjust the fiber content in the part that is to be obtained.

In the presently described example, the portion 111 of the porous material mold 110 includes a channel 1111 for injecting a filled slurry into the fiber texture, as explained in detail below.

The injection tooling 100 also has an enclosure 130 of rigid material in which the porous material mold 110 is held. The enclosure 130 has a bottom 131, a side wall 132 secured to the bottom 131, and a cover 133. The enclosure 130 may be made of any type of material that presents sufficient stiffness to withstand the pressures of injecting the slurry and of vacuum pumping to discharge its liquid phase. In particular, the enclosure may be made of a metal or plastics material.

The cover 133 includes an injection port 134 through which the slurry is to be injected in order to penetrate into the pores of the fiber texture 10. In the example shown in FIGS. 1 and 2, the slurry is for injecting through an injection port 134 that leads into the mold cavity 113. Nevertheless, it would not go beyond the ambit of the invention for the slurry to be injected through a plurality of injection ports leading into the mold cavity.

The enclosure 130 has a single discharge vent 135 for discharging the liquid medium of the slurry, which vent is present in this example in the side wall 132 in the neighborhood of the bottom 131. Naturally, it would not go beyond the ambit of the invention if a plurality of outlet vents were to be used at different locations of the enclosure.

In the presently described implementation, the porous material mold 110 is of a size that is smaller than the inside volume of the enclosure 130 made of metal material. Under such circumstances, the volume present between the mold made of porous material and the enclosure made of metal material is filled with a porous medium 120 in order to allow the liquid phase of the slurry to flow and be discharged. In particular, the porous medium 120 may be constituted by sand, a foam, or a granular material. If foam is used, any rigid or flexible type of foam that presents an array of pores allowing the liquid medium of the slurry to pass through may be used as the porous medium. Likewise, any type of granular material having a packing fraction compatible with passing the liquid phase of the slurry may be used as the porous medium. The porous medium 120 includes a duct 121 in communication both with the injection port 134 of the enclosure 130 and also with the channel 1111 of the porous material mold 110 in order to enable the slurry to be injected into the fiber texture 10.

The empty volume present in the porous medium is preferably greater than the quantity or volume of the liquid phase of the slurry that is to be injected into the fiber texture. This makes it possible to discharge all of the liquid phase from the walls of the porous mold when a vacuum is drawn via the discharge vent(s) and/or while pressure is applied via the injection port.

In a variant implementation, the porous material mold presents outside dimensions equivalent to the inside volume of the enclosure. Under such circumstances, the porous material mold is directly in contact with the inside walls of the enclosure. Under such circumstances, the dimensions of the porous material mold are preferably selected so that it presents a void volume greater than the quantity or volume of the liquid phase of the slurry that is to be injected into the fiber texture. This makes it possible to optimize filling of the fiber texture when a vacuum is drawn via the discharge vent(s).

By way of example, the porous material mold 110 may be made from a porous resin. Under such circumstances, the portions 111 and 112 of the mold 110 are themselves made by injection molding and polymerizing a resin between a mold and a counter-mold, the mold presenting a shape corresponding to the recesses 1110 and 1120 of the portions 111 and 112, if said recesses are identical. Otherwise, a different mold is used for each of the portions 111 and 112 so as to form a different recess in each of them. The characteristics of the array of pores within the mold, in particular in terms of pore size and porosity (void fraction), can be controlled by adjusting the polymerization cycle(s) as a function of the nature of the resin used. Consequently, there are as many options for pore arrays as there are available porous resins. By way of non-limiting examples, the following porous resins may be used for making the porous material mold:

Gil-Resin® T with pores of a size lying in the range 8 micrometers (μm) to 13 μm;

Gil-Resin® F+ with pores of a size lying in the range 4 μm to 7 μm;

SamaPore with pores of a size lying in the range 3 μm to 10 μm; and

Microplast Fine with pores having a mean size of 7 μm.

The mold 110, or more precisely the portions 111 and 112 constituting the mold 110, may be made of a rigid porous material such as microporous polytetrafluoroethylene (PTFE) such as the products "microporous PTFE" sold by the supplier Porex®. In order to make the mold 110, it is possible by way of example to use the material PM 0130 sold by the supplier Porex® and having a pore size lying in the range 1 μm to 2 μm. Each of the recesses 1110 and 1120 is respectively made by thermoforming or machining the porous material.

By way of non-limiting example, the mold 110 may also be made out of plaster.

The porous material mold 110 enables the liquid medium of the slurry to be drained out from the fiber texture 10 and to be discharged via the vent 135 as a result of applying a pressure gradient between the vent 135 and the injection port 134.

By way of example, the mean (D50) pore size of the porous material mold may lie in the range 1 μm to 10 μm, for example.

Figure 3:
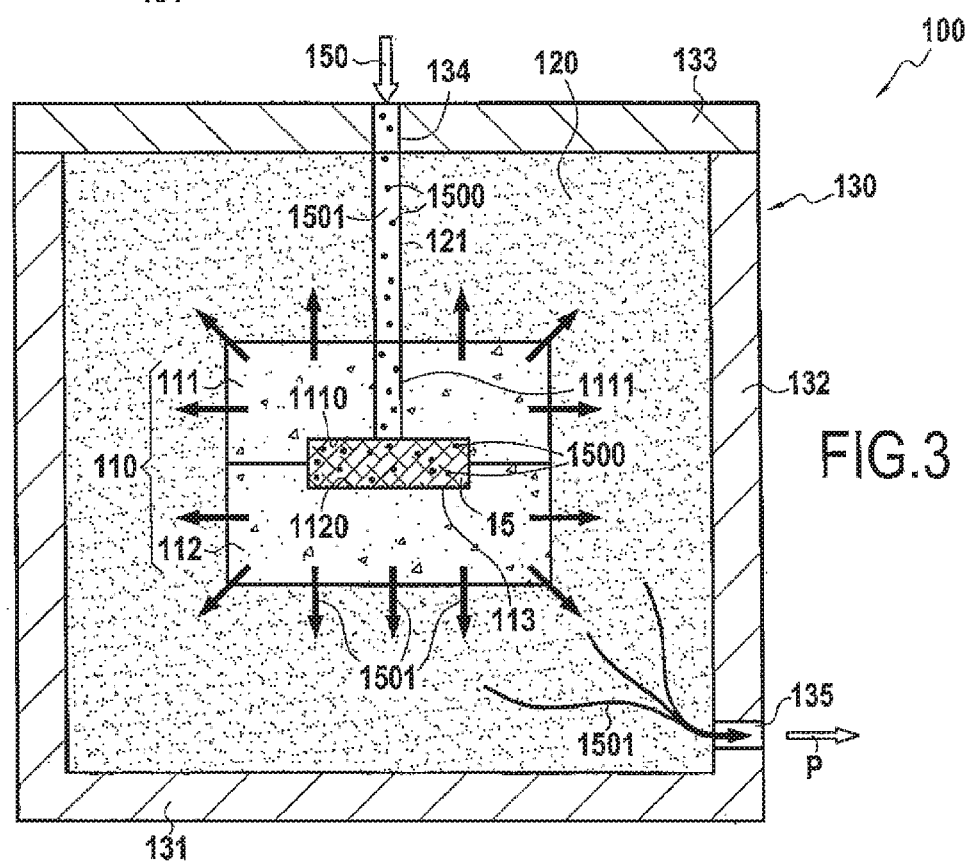
FIG. 3 is a diagrammatic section view showing the steps of impregnating a fiber texture with a filled slurry in the tooling of FIG. 2.

FIG. 3 shows the configuration obtained while injecting a slurry 150 and draining its liquid phase or medium. Before injecting the slurry into the tooling, a vacuum is drawn within the porous material mold so that the fiber texture can subsequently be maximally filled with the slurry. The vacuum may be drawn by pumping via the discharge vent 135.

In FIG. 3, the slurry 150 has been injected under pressure via the injection port 121 and has been transported to the fiber texture 10 via the duct 121 and the channel 1111 so as to penetrate into the fiber texture 10. The refractory particles 1500 present in the slurry 150 are for forming a refractory ceramic matrix in the pores of the fiber texture 10. In an embodiment, this refractory ceramic matrix may be a refractory oxide matrix.

By way of example, the slurry may be a suspension of an alumina powder in water. The alumina powder used may be an alpha alumina powder sold by the supplier Baikowski under the name SM8.

More generally, the slurry may be a suspension including refractory ceramic particles presenting a particular mean size lying in the range 0.1 µm to 10 µm. Prior to injection, the volume fraction of refractory ceramic particles in the slurry may lie in the range 15% to 40%. The refractory ceramic particles may comprise a material selected from: alumina; mullite; silica; aluminosilicates; aluminophosphates; carbides; borides; nitrides; and mixtures of such materials. Depending on their basic composition, the refractory ceramic particles may also be mixed with particles of alumina, of zirconia, of aluminosilicate, of a rare earth oxide, of rare earth silicate (which may for example be used in environmental or thermal barriers), or any other filler serving to provide a function for the composite material part that is to be obtained, such as carbon black, graphite, or silicon carbide.

By way of example, the liquid phase or medium of the slurry may comprise an aqueous phase presenting an acid pH (i.e. a pH of less than 7) and/or an alcohol phase, e.g. comprising ethanol. The slurry may include an acidifier, such as nitric acid, and by way of example the pH of the liquid medium may lie in the range 1.5 to 4. In addition, the slurry may include an organic binder such as polyvinyl alcohol (PVA), which is soluble in particular in water.

As shown in FIG. 3, after injection of the slurry 150, the refractory ceramic particles 1500 are present in the pores of the fiber texture 10. Arrows 1501 represent the movement of the liquid phase or medium 1501 of the slurry drained by the porous material mold 110.

It is also possible to apply pumping P to the outlet vent 135 while draining, e.g. by means of a primary vacuum pump. Performing such pumping serves to improve drainage and to dry the fiber texture more quickly.

In this configuration, the porous material mold 110 serves to retain within the fiber texture 10 the refractory ceramic particles 1500 initially present in the slurry so that some or all of these particles become deposited by filtering in the fiber texture 10.

By using the porous material mold 110, the liquid phase or medium 1501 of the slurry can be drained out from the fiber texture 10 in all directions, with the liquid phase or medium 1501 subsequently flowing through the porous medium 120 to the vent 135 through which it is discharged out from the injection tooling 100. This draining of a liquid medium in all directions serves to enhance deposition of the refractory ceramic particles 1500 by uniform and dense sedimentation in the fiber texture 10, and consequently to obtain a matrix volume fraction in the final part that is high.

Also, since the porous material mold 110 is held in an enclosure 130 made of rigid material, it can withstand the pressure with which the filled slurry is injected into the texture and also the pressure exerted by the pumping in order to discharge the liquid medium of the slurry.

Once the injection and drainage steps have been performed, a fiber preform 15 is obtained that is filled with refractory ceramic particles, e.g. particles of refractory ceramic oxide or of alumina.

The resulting preform is then dried and then unmolded, with the unmolded preform conserving the shape it adopted in the mold cavity.

The preform is then subjected to sintering heat treatment, e.g. in air at a temperature lying in the range 1000° C. to 1200° C., in order to sinter the refractory ceramic particles and thereby form a refractory ceramic matrix in the pores of the fiber preform. This produces a composite material part, e.g. an oxide/oxide composite material part, having fiber reinforcement formed by the fiber preform and presenting a matrix volume fraction that is high with the refractory ceramic matrix being uniformly distributed throughout the fiber reinforcement.

A CMC composite material part other than an oxide/oxide part can be obtained in the same manner by making the fiber texture out of silicon carbon and/or carbon fibers and by using a slurry filled with particles of carbide (e.g. SiC), of boride (e.g. $TiB_2$), or of nitride (e.g. $Si_3N_4$).

The invention claimed is:

1. A method of fabricating a composite material part, the method comprising:
   forming a fiber texture from refractory ceramic fibers;
   placing the fiber texture in injection tooling;
   injecting under pressure a slurry containing a powder of refractory ceramic particles into the fiber texture;
   draining liquid of the slurry that has passed through the fiber texture, while retaining the powder of refractory ceramic particles within said texture so as to obtain a fiber preform that is filled with refractory ceramic particles;
   drying the fiber preform;
   unmolding the fiber preform; and
   sintering the refractory ceramic particles present in the fiber preform in order to form a refractory matrix in said preform;
   wherein the injection tooling comprises a mold of porous material including an internal housing in which the fiber texture is placed and enclosed, the slurry being injected into the fiber texture via at least one injection port present in the injection tooling passing through the mold of porous material and leading into the internal housing of the porous material mold, the tooling further comprising an enclosure made of rigid material in which the porous material mold is held while injecting the slurry under pressure and while draining the liquid of said slurry, the liquid of the slurry being discharged via at least one vent present in the rigid material enclosure.

2. A method according to claim 1, wherein the porous material mold presents a size smaller than the inside volume of the rigid material enclosure, and wherein the volume present between the porous material mold and the rigid material enclosure is filled in with a porous medium.

3. A method according to claim 2, wherein the porous medium is constituted at least by sand or a foam.

4. A method according to claim 2, wherein the empty volume present in the porous medium is greater than the volume of the liquid phase of the slurry injected into the fiber texture.

5. A method according to claim 1, wherein the mold is made of a material selected from one of the following materials: porous resin and plaster.

6. A method according to claim 1, wherein, during the forming of the fiber texture, yarns are woven with a three-dimensional or multilayer weave.

7. A method according to claim 1, wherein yarns of the fiber texture are made of fibers constituted by one or more of the following materials: alumina; mullite; silica; an aluminosilicate; a borosilicate; silicon carbide; and carbon.

8. A method according to claim 1, wherein the refractory ceramic particles are made of a material selected from: alumina; mullite; silica; an aluminosilicate; an aluminophosphate; zirconia; a carbide; a boride; and a nitride.

9. A method according to claim 1, wherein the resulting part made of composite material constitutes a turbine engine blade.

10. A method according to claim 1, wherein the mold of porous material surrounds the entire fiber preform.

11. A method according to claim 1, wherein the mold of porous material surrounds the entire fiber preform to permit draining liquid of the slurry that has passed through the fiber texture via any point of an interface between the fiber texture and the mold of porous material.

12. A method according to claim 1, wherein the enclosure made of rigid material surrounds, and is spaced apart from, the entire mold of porous material during the injecting and draining.

13. A method according to claim 1, wherein a volume present between the enclosure made of rigid material and the mold of porous material is filled with a porous medium.

14. A method according to claim 13, wherein the porous medium is sand or foam.

15. A method according to claim 1, wherein the rigid material is plastic or metal.

16. A method according to claim 1, wherein the porous material mold is made up of two portions, each having a respective recess that defines the internal housing of the porous material mold.

* * * * *